3,327,013
SELECTIVE HYDROGENATION PROCESS AND CATALYST
Ludo K. Frevel, Midland, and Leonard J. Kressley, Saginaw, Mich., assignors to The Dow Chemical Company, Midland, Mich., a corporation of Delaware
No Drawing. Filed Dec. 2, 1965, Ser. No. 511,218
9 Claims. (Cl. 260—681.5)

This invention relates to processes and certain improved catalysts for the selective hydrogenation of acetylenic compounds in the presence of diene. More particularly, the present invention relates to methods of reclaiming catalysts, to the preparation of improved catalysts, and to the catalytic reduction of acetylenic bonds in the presence of dienes without substantial destruction of the diene compounds.

It is known that catalysts containing copper mixed with minor amounts of other metals (the oxides of which may be reduced to the metal under relatively low hydrogenation temperatures) may be used to reduce the amounts of acetylenic compounds in diene-containing hydrocarbon streams. Product specifications for diene compounds which are to be commercially used have steadily decreased the amount of acetylenic compounds which may be tolerated in the monomeric dienes. This is especially true of polymer grade conjugated dienes such as 1,3-butadiene, since even very small amounts of acetylenic contamination interfere both with the proper polymerization of the diene and with many hydrocarbon extraction processes used to separate the polymers.

According to one aspect of the invention, a catalyst with improved activity for the selective hydrogenation of acetylenic compounds in the presence of dienes without extensive destruction of the dienes, is obtained by impregnating a preformed (used or unused) copper-containing selective hydrogenation catalyst (in either oxidized or reduced form) with a base such as a basic alkali metal salt or hydroxide, heating the impregnated catalyst at a temperature of from about 350° to 650° C. for from about 1 to 5 hours and then extracting the roasted catalyst with water or partially condensed steam.

The preformed copper-containing selective hydrogenation catalysts may be prepared by first immersing a support material (for example, a porous form of silica such as diatomaceous earth) in an aqueous solution of the metal salts (usually metal nitrates). Unabsorbed liquor is decanted or otherwise removed and the impregnated support may then be dried and heated in air, converting the metal salts to the corresponding oxides. The resulting material is then treated with hydrogen to reduce the metal oxides to the corresponding metals. In order to improve selectivity and capacity of the catalyst, the oxidized form of the selective hydrogenation catalyst is then impregnated with a base (preferably in aqueous solution), dried and heated to a temperature of up to about 650° C. for a period of from about 1 to 5 hours, and then leached with water. This leached material is subsequently reduced using hydrogen to give a catalytic material of improved activity.

Typical mixtures of catalytic metals (customarily admixed or deposited on porous silica or other suitable support materials) which may be treated according to the invention include mixtures of copper with one or more of the following metals (designated as Group A metals): nickel, zinc, cobalt, molybdenum, manganese, vanadium, tungsten, cadmium, titanium, zirconium and uranium. Examples of such mixtures of catalytic metals include compositions which contain at least about 80 percent by weight of copper admixed with from 20 percent by weight down to a catalytic trace of at least one Group A metal. This mixture of catalytic metals is dispersed on or within any suitable inert catalytic support material (preferably porous silica). The catalysts are generally prepared by dispersing the mixed oxides of the metals on the support. The catalyst may be transported or added in this form to the hydrogenation reactors, since the oxides are reduced to the metal under hydrogenation conditions. Other typical copper-containing selective hydrogenation catalysts which may be improved according to this invention are described in the art.

To illustrate a specific embodiment of the invention, several preformed selective hydrogenation catalysts composed of mixtures of from 90 to 97 percent by weight of copper and from 3 to 10 percent by weight of at least one Group A metal (as previously defined) dispersed or supported on suitable inert porous substrates, were tested for initial hydrogenation activity, capacity and selectivity. Samples of freshly prepared catalysts as well as samples of regenerated (used) catalysts were used. Regenerated catalysts were obtained by roasting used catalysts in air at from 400° to 700° C., followed by reduction of the oxidized catalysts with hydrogen. Samples of the catalysts were then impregnated with an aqueous solution of a base such as sodium hydroxide, cesium hydroxide, lithium hydroxide or potassium hydroxide. Solutions containing from about 1 to 3 percent by weight of base are ordinarily adequate but higher or lower concentrations may be employed. The impregnated catalysts were dried using any convenient temperature (usually at 160° C.), roasted at a temperature of from about 350° to 650° C. (preferably at about 500° F. in the presence of air or oxygen) and then retested for hydrogenation capacity and selectivity. All of the used catalysts showed marked improvements when treated according to the process of the invention. With new catalysts (i.e., unused), the improvement obtained varied with the initial characteristics of the new catalyst. For example, a new copper-nickel catalyst (with high initial activity) showed very little increase in activity after treatment according to the process of the invention, whereas used copper-nickel catalysts were greatly improved by the treatment. Other new copper-containing catalysts gave results after treatment in proportion to their initial activities, with the least active new catalysts generally showing a greater improvement.

In a typical selective hydrogenation run, a feed mixture containing at least about 30–40 mole percent of a diene (such as 1,3-butadiene) in admixture with olefins and acetylenic contaminants (especially methyl acetylene, $C_4$-acetylenes, etc.) was contacted with both the modified and unmodified catalysts in a fixed bed at temperatures of from 160° to 230° C. (preferably at about 175°–185° C.) using an hourly space velocity (HSV) of from about 100 to 1200 (preferably 200–600) volumes of feed per volume of catalyst per hour. Under comparable catalytic conditions (time, temperature, space velocity and uniform feed composition), the amount of acetylenic compounds in the effluent from the modified catalyst bed was less than the amount obtained using an unmodified catalyst. This is an especially significant improvement in view of the fact that the concentration of acetylenic compounds in the effluent from the bed containing unmodified catalyst is usually itself very low (in the order of a few hundred parts per million). Further reductions in the concentration of acetylenic compounds at these low levels (especially without a corresponding loss of dienes such as 1,3-butadiene) are extremely difficult to obtain, both in the laboratory and in large scale commercial operations. Furthermore, it has been found that the space velocities employed during hydrogenation may be increased using the improved catalyst materials of the present invention. This increase in HSV is not accompanied by degradation of the quality of the effluent from the hydrogenation zone. When hydrocarbon acetylenic compounds containing four carbon atoms ($C_4$-acetylenic compounds) are selectively hydrogenated in the presence of butadiene, the actual amount of butadiene in the effluent stream from the reactor may be increased. For example, the selective hydrogenation of vinyl acetylene in the presence of 1,3-butadiene results in an increase in the total amount of 1,3-butadiene. The selective hydrogenation of butadiene contaminated with significant amounts of $C_4$-acetylenic hydrocarbon compounds thus gives an especially advantageous improvement.

Typical feed streams which may be successfully treated according to the invention include commercial hydrocarbon-containing streams obtained in petroleum refining and cracking operations. Such streams usually contain alkanes with up to about 5 carbon atoms, olefins (such as ethylene, propylene, butylene, amylene), diolefins (such as allene, butadiene, 1,3-dimethylallene, isoprene, 1,3-pentadiene) and relatively minor amounts of acetylenic compounds such as acetylene, methyl acetylene, ethyl acetylene, vinyl acetylene, etc. as well as some additional hydrocarbons and other organic compounds with more than 5 carbon atoms. For the most part, $HC \equiv CH$ is most economically removed from the feed mixture by distillation techniques, but may also be removed by catalytic hydrogenation according to the present invention.

The following examples are submitted for the purpose of illustration only and are not to be construed as limiting the scope of the invention in any way.

EXAMPLE I.—GENERAL METHOD

A synthetic feed stock (designated as feed mixture B) of the following composition (analysis by vapor phase chromatography) was employed:

| Components: | Concentration (weight percent) |
|---|---|
| Propylene | 2.1 |
| Isobutane | 5.1 |
| Butene-1 | 20.6 |
| Isobutylene | 25.0 |
| Cis-butene-2 | 4.2 |
| Trans-butene-2 | 2.1 |
| 1,3-butadiene | 40.1 |
| $C_4$-acetylenes | 0.61 |
| Methyl acetylene | 0.1 |
| Total | 99.91 |

The tests given the treated catalyst samples were usually more severe than conditions encountered during normal operation. Flows through the catalyst bed were increased severalfold over the usual rates in order to critically evaluate catalyst improvement. Catalyst performance was measured by determining the amounts of $C_4$-acetylenic compounds remaining in the effluent from the reactor bed. Space velocities (volumes of feed at standard temperature and pressure per volume of catalyst per hour) were varied from about 90 to 750. The initial concentrations of $C_4$-acetylenic compounds of the feed stream were compared with the final concentrations obtained after the hydrogenation reaction in the catalyst bed. The feed stream was mixed with an excess of hydrogen (i.e., at least an amount of hydrogen sufficient to reduce all of the acetylenic compounds to olefins). About twice the theoretical amount of hydrogen necessary to reduce the acetylenic compounds was employed. The trace amounts of $C_3$ acetylenes were similarly removed during the selective hydrogenation.

*General method of catalyst treatment*

For comparative purposes, the catalysts were treated with varying amounts and kinds of basic materials. The general treatment was carried out as follows:

(1) The used catalyst was roasted in air. This step was omitted for freshly prepared catalyst materials;

(2) The cooled catalyst material was impregnated with aqueous base;

(3) The impregnated catalyst was dried and roasted at elevated temperature (usually about 500° C.) for 2 to 3 hours;

(4) The material from (3) was leached with water; and (5) The leached catalyst was dried and reduced at about 300°–350° C. with hydrogen (ordinarily in admixture with nitrogen or steam).

Results are summarized in Tables 1 and 2 for both used and unsued catalysts, respectively. Used catalysts were considered "spent" when concentrations of acetylenic compounds of less than 200 p.p.m. could not be obtained with hourly space velocities greater than 100. Runs 1–3 and 6 represent controls which were not treated with base. Different HSV's and reaction temperatures were used in Runs 1–3 to show the general performance of the "spent" used catalyst both before and after attempts to regenerate the catalyst by heating the "spent" catalyst in air at elevated temperature and then reducing the catalyst with hydrogen. Runs 6 and 7 show the results obtained with a sample of "new" catalyst compared with the performance of this same catalyst after treatment with aqueous LiOH. The catalyst used in Runs 1–5 had the following composition: 20 percent by weight of mixed oxides of copper and nickel (atom ratio of Cu:Ni=95:5) and the remainder diatomaceous earth support material. The catalyst used in Runs 6–7 had the following composition: 15 percent by weight of mixed oxides of copper and nickel (atom ratio of Cu:Ni=95:5) with the remainder diatomaceous earth.

TABLE I.—USED CATALYSTS

| Run Number | Hourly space velocity-HSV (volumes of feed per volume of catalyst per hour) | Temp. of catalyst bed (° C.) | Base (kind and concentration) | $C_4$-acetylenic composition (based on weight of total composition) | | Remarks |
|---|---|---|---|---|---|---|
| | | | | Initial concentration, parts per million | Final concentration, parts per million | |
| 1 (Control) | 93 | 223 | None | 6,100 | 2,370 | Sample of untreated "spent" used catalyst. |
| 2 (Control) | 350 | 180 | do | 6,100 | >2,000 | Do. |
| 3 (Control) | 360 | 181 | do | 6,100 | >2,000 | Sample of untreated "spent" used catalyst (roasted at 700° C.). |
| 4 | 460 | 180 | NaOH, 2% (wt.) aqueous | 6,100 | 13 | |
| 5 | 346 | 180 | KOH, 1.4% (wt.) aqueous | 6,100 | 81 | Used "spent" catalyst of Run 1 treated according to steps (1)–(5) of General Method. |

TABLE II.—UNUSED CATALYSTS

| Run Number | Hourly space velocity-HSV (volumes of feed per volume of catalyst per hour) | Temp. of catalyst bed (° C.) | Base (kind and concentration) | C₄-acetylenic composition (based on weight of total composition) | | Remarks |
| --- | --- | --- | --- | --- | --- | --- |
| | | | | Initial concentration, parts per million | Final concentration, parts per million | |
| 6 (Control) | 700 | 180 | None | 6,100 | 256 | Freshly prepared catalyst, ready for use. |
| 7 | 550 | 180 | LiOH, 1% (wt.) aqueous | 6,100 | 92 | Fresh catalyst treated according to steps (2)-(5) of General Method. |

EXAMPLE II.—Cu-V CATALYST

A supported catalyst composed of 15.0 percent by weight of mixed oxides of copper and vanadium (atom ratio of 95.0 copper atoms per 5.0 vanadium atoms) and 85 percent by weight of diatomaceous earth support (granular Silocel, a porous form of silica) was used. A 7.70 gram sample of this catalyst (bulk volume of 20 milliliters) in a tube reactor was used to selectively hydrogenate acetylenic compounds contained in the feed mixture B described in Example I. The catalyst was reduced in a hydrogen-containing stream prior to use. A feed flow rate of 183 milliliters per minute (25.4 grams per hour; space velocity in volumes of feed per volume of catalyst per hour, HSV=549) was used with excess hydrogen added at a rate of approximately 4.5 milliliters per minute (measured at 24° C. at one atmosphere). The condensed (selectively hydrogenated) product obtained from this run of the reactor contained 730 p.p.m. of acetylenic compounds. The catalyst sample was then heated in air at 500° C. for two hours, mixed with 9.1 milliliters of 3 percent by weight aqueous NaOH solution, dried and reheated at 500° C. for one hour, leached with water in a Soxhlet extractor for 4 hours, dried, and then reduced at 350° C. using a mixture containing 5 volume percent of hydrogen in nitrogen. The catalyst was then retested using samples of the same feed mixture as described in Example I. Using the same ratio of hydrogen to feed mixture, it was found that a higher flow rate of feed through the hydrogenation catalyst could be employed. At a feed flow rate of about 228 milliliters per minute (HSV=684), the condensed effluent from the reactor was found to contain less than 1 part per million (p.p.m.) by weight of acetylenic compounds. The reactor temperature was held at approximately 180° C. throughout both runs.

EXAMPLE III.—Cu-Co CATALYST

A supported catalyst composed of 15.0 percent by weight of mixed oxides of copper and cobalt (atom ratio Cu:Co=98.2:1.8) and 85.0 percent by weight of diatomaceous earth support (granular Silocel porous silica) was used for the selective hyrogenation reaction. An 8.36 gram sample (20 milliliters bulk volume) in a tube reactor was used to selectively hydrogenate the acetylenic compounds contained in feed mixture B. The catalyst was reduced with hydrogen prior to use. A feed flow rate to the hydrogenation reactor of 330 milliliters per minute (46 grams per hour, HSV=990) was used with excess hydrogen added at a rate of approximately 4.5 milliliters per minute (24° C., 1 atmosphere). The condensed product contained 474 p.p.m. of acetylenic compounds. The catalyst sample was heated in oxygen (air) for two hours, contacted with 7.1 milliliters of 3 percent by weight aqueous NaOH solution, heated to 550° C. for one hour, leached with water in a Soxhlet extractor for 5 hours, dried and reduced at 350° C. with a mixture containing 5 volume percent of hydrogen and the remainder nitrogen. The catalyst was then retested using the same feed mixture described in Example I and the same hydrogen flow rate. At a feed flow rate of approximately 395 milliliters per minute (55.6 grams per hour; HSV=1185), the effluent from the hydrogenation reactor was found to contain only 20 p.p.m. of acetylenic compounds. The reactor temperature was held at approximately 180° C. throughout both runs.

EXAMPLE IV.—Cu-U CATALYST

A supported catalyst composed of 43 percent by weight of mixed oxides of copper and uranium (atom ratio Cu:U=90:10) and 57 percent by weight of diatomaceous earth support ("Celite C-22" diatomaceous earth) was used for the selective hydrogenation reaction. An 11.82 gram sample of this catalyst (bulk volume of 20 milliliters) in a tube reactor was used (after reduction with hydrogen) to selectively hydrogenate the acetylenic compounds contained in feed mixture B. A feed flow rate to the dehydrogenation zone of approximately 448 milliliters per minute (61.5 grams/hour; HSV=1344) was employed with excess hydrogen added at a rate of about 9 milliliters per minute (24° C., 1 atmosphere). The condensed selectively hydrogenated product obtained from this run contained 420 p.p.m. of acetylenic compounds. The supported catalyst was then heated at 460° C. for 1.3 hours, contacted with 10.0 milliliters of 3 percent aqueous NaOH, dried at 140° C. for one hour, roasted at 400°-430° C. for 2 hours, leached with water in a Soxhlet extractor for 4 hours, dried at 140° C. and heated at 400° C. for one hour. The treated catalyst was then reduced at 350° C. using a 5 volume percent mixture of hydrogen in 95 volume percent of nitrogen. Using this modified catalyst to hydrogenate the same feed mixture B at a flow rate of 490 milliliters per minute (67.5 grams per hour; HSV=1470) and the same hydrogen flow rate (9 milliliters per minute), the effluent from the reactor contained only 46 p.p.m. of acetylenic compounds. The reactor temperature was held at 180°±5° C. for both runs.

The catalyst used for this experiment was prepared by dissolving 2.51 grams of $UO_2(NO_3)_2 \cdot 6H_2O$ and 12.08 grams of $Cu(NO_3)_2 \cdot 3H_2O$ in 5.00 milliliters of water. This solution was used to impregnate 7.50 grams of Celite C-22 diatomaceous earth (8-14 mesh, U.S. Sieve Series) at 55° C. The impregnated granules were dried at 140° C. for two hours and then heated at 400° C. for 1½ hours, yielding a total of 13.15 grams of dried catalyst.

EXAMPLE V.—Cu-Mo CATALYST

A 7.2 gram sample (bulk volume of 20 milliliters) of Silocel supported catalyst (15 percent by weight mixed oxides of copper anrd molybdenum, 85 percent diatomaceous earth, atom ratio of Cu:Mo=93.4:6.6) was used (after reduction with hydrogen) to selectively hydrogenate feed mixture B. The reactor was run for one hour at a feed flow rate of 163 milliliters per minute with excess hydrogen added at a flow rate of 3.8 milliliters per minute. The reactor effluent obtained during the next 64 minutes of reactor operation contained 697 p.p.m. of acetylenic compounds. The reactor was run for another hour and then the Cu-Mo catalyst was deliberately poisoned by contacting the catalyst with a stream of COS (1 volume percent COS with 99 volume percent $N_2$) at a flow rate of 100 milliliters per minute for a period of 100 minutes. A subsequent test showed the catalyst to be inactive. The catalyst was then heated at 550° C. for two hours, mixed with 6.2 milliliters of 3 percent by weight aqueous NaOH solution, dried and reheated at 550° C. for two hours. The treated catalyst was then leached for six hours with water in a Soxhlet extractor, dried and reduced at 350° C. using a 5:95 volume percent mixture of hydrogen and nitrogen. The reduced catalyst was again used to selectively hydrogenate feed mixture B under the same conditions employed prior to poisoning the catalyst, but using a higher feed flow rate. Reactor effluent was essentially free of acetylenic contamination (i.e., less than 1 p.p.m. acetylenic compounds). Reactor temperature was held at about 180° C. during all runs.

EXAMPLE VI.—Cu-W CATALYST

A supported catalyst composed of 15.5 percent by weight of mixed oxides of Cu and W (atom ratio of Cu:W=97.6:2.4) and 84.5 percent by weight of Celite C-22 diatomaceous earth was used to hydrogenate feed mixture B. An 8.20 gram sample of this catalyst (20 milliliters bulk volume) was employed after pre-reduction with hydrogen. The feed flow rate was about 150 milliliters per minute (20.5 grams per hour; HSV=450) with excess hydrogen added at a flow rate of about 4.5 milliliters per minute (volume at 24° C., 1 atmosphere). The reactor effluent contained 1046 p.p.m. of acetylenic compounds. The Cu-W catalyst was then heated in air at 500° C. for one hour, cooled, mixed with 8.3 milliliters of 3 percent aqueous NaOH solution, heated in air at 500° C. for one hour, leached with water in a Soxhlet extractor for 3.5 hours, dried, heated in air at 500° C. for one hour and then reduced at 350° C. in the presence of hydrogen. The catalyst was then retested for selective hydrogenation activity using feed mixture B and the same ratio of hydrogen to feed mixture. At an increased feed flow rate of 240 milliliters per minute (33.2 grams per hour; HSV=720), the hydrogenated effluent from the reactor contained only 40 p.p.m. of acetylenic compounds.

The catalyst used in this experiment was prepared as follows:

Ammonium para-tungstate (0.46 gram) was dissolved in aqueous $N(CH_3)_4OH$. Sufficient concentrated aqueous $NH_4OH$ was added to 14.0 grams of $Cu(CH_3COO)_2 \cdot H_2O$ to form a saturated solution. The two solutions were then mixed to form 27 milliliters of final solution which was used to impregnate 30 grams of Celite C-22 diatomaceous earth (6–8 mesh, U.S. Sieve Series). The impregnated granules were dried at 140° C. for one hour and roasted in air at from 200° to 400° C. for two hours, yielding 35.5 grams of dried catalyst prior to reduction with hydrogen.

EXAMPLE VII.—Cu-Mn CATALYST

A supported catalyst composed of 15 percent by weight of mixed oxides of copper and manganese (atom ratio 94.4 atoms of copper per 5.6 atoms of manganese) and 85 percent by weight of Silocel granular diatomaceous earth was used (after reduction with hydrogen) to hydrogenate feed mixture B. A 9.24 gram sample of this catalyst (20 milliliters bulk volume) was treated with 6.6 milliliters of 3 percent by weight of aqueous NaOH solution, dried at 120° C., roasted in air at 550° C. for two hours, leached with water in a Soxhlet extractor for six hours, dried at 120° C. and then reduced at 350° C. using hydrogen diluted with an inert gas (nitrogen). This reduced catalyst was used to dehydrogenate a feed stream of the following composition (designated as feed mixture C):

| | Volume percent |
|---|---|
| 1,3-butadiene | 39.8 |
| Isobutylene | 32.6 |
| 1-butene | 13.2 |
| 2-butene | 6.4 |
| n-Butane | 5.5 |
| Isobutane | 1.7 |
| Vinyl acetylene | 0.6 |
| Ethyl acetylene | |
| $CO_2$ | 0.2 |
| Total | 100.0 |

The reactor containing the catalyst was held at approximately 180° C. during the experiment. Feed mixture C was fed to the reactor for two hours at a flow rate of approximately 400 milliliters per minute (56.2 grams per hour; HSV=1200) with excess hydrogen added at a rate of about 6.5 milliliters per minute (volume at 24° C. under 1 atmosphere pressure). The condensed product from the reactor contained less than 5 p.p.m. of acetylenic compounds, with no butadiene loss occurring at this high hourly space velocity.

We claim as our invention:

1. A process of improving a selective hydrogenation catalyst containing as essential ingredients copper and from a trace to about 20% by weight based on the total active ingredients of at least one Group A metal, as defined herein, said catalyst being suitable for the hydrogenation of acetylenic compounds in the presence of dienes which comprises:
   (a) contacting the catalyst with a basic alkali metal compound to form an impregnated product,
   (b) heating the impregnated product of (a) at a temperature of up to 650° C. to effect a reaction with said basic alkali metal compound, and
   (c) leaching the product of (b) with water.

2. The process of claim 1 wherein the steps are carried out before initial use and in the regeneration of the selective hydrogenation catalyst which contains at least one member selected from the group consisting of:
   (a) copper and oxides of copper, and at least one member selected from the group consisting of:
   (b) tungsten, manganese, molybdenum, cobalt, vanadium, uranium and oxides thereof.

3. The process of claim 1 wherein the basic alkali metal compound is lithium hydroxide.

4. The process of claim 1 wherein the basic alkali metal compound is sodium hydroxide.

5. The process of claim 1 wherein the basic alkali metal compound is potassium hydroxide.

6. The process of claim 1 wherein the selective hydrogenation catalyst has been used to hydrogenate acetylenic compounds in the presence of 1,3-butadiene.

7. A selective hydrogenation catalyst prepared according to the process of claim 1.

8. A method of selectively hydrogenating acetylenic compounds in a mixture containing diene compounds which comprises contacting said mixture with hydrogen in the presence of a catalytic amount of a selective hydrogenation catalyst of claim 6.

9. A selective hydrogenation catalyst composition containing:
   (a) at least one member selected from the group consisting of copper and mixed oxides of copper, and
   (b) at least one member selected from the group consisting of uranium, tungsten and oxides thereof.

References Cited

UNITED STATES PATENTS 2,426,604    9/1947    Frevel _____ 260—681.5

DELBERT E. GANTZ, *Primary Examiner.*

G. E. SCHMITKONS, *Assistant Examiner.*